US009864576B1

(12) United States Patent
Liu et al.

(10) Patent No.: US 9,864,576 B1
(45) Date of Patent: Jan. 9, 2018

(54) VOICE CONTROLLED ASSISTANT WITH NON-VERBAL USER INPUT

(71) Applicant: Rawles LLC, Wilmington, DE (US)

(72) Inventors: Baiyang Liu, Bellevue, WA (US); Hugh Evan Secker-Walker, Newburyport, MA (US)

(73) Assignee: Amazon Technologies, Inc., Seattle, WA (US)

( * ) Notice: Subject to any disclaimer, the term of this patent is extended or adjusted under 35 U.S.C. 154(b) by 378 days.

(21) Appl. No.: 14/021,824

(22) Filed: Sep. 9, 2013

(51) Int. Cl.
*G06F 3/16* (2006.01)

(52) U.S. Cl.
CPC .................... *G06F 3/167* (2013.01)

(58) Field of Classification Search
CPC .......... G06F 3/016; G06F 3/01; G06F 1/3218; G06F 3/048; G06F 3/0482; G06F 3/0488; G06F 3/167
See application file for complete search history.

(56) References Cited

U.S. PATENT DOCUMENTS

| 5,430,827 | A  | * | 7/1995 | Rissanen ................... G06F 3/16 704/246 |
| 6,525,717 | B1 | * | 2/2003 | Tang ...................... G06F 3/0202 178/18.04 |
| 7,418,392 | B1 |   | 8/2008 | Mozer et al. |
| 7,720,683 | B1 |   | 5/2010 | Vermeulen et al. |
| 7,774,204 | B2 |   | 8/2010 | Mozer et al. |
| 2002/0050983 | A1 | * | 5/2002 | Liu ..................... G06F 3/03545 345/173 |
| 2007/0152977 | A1 | * | 7/2007 | Ng ....................... G06F 3/03547 345/173 |
| 2011/0037734 | A1 | * | 2/2011 | Pance ..................... G06F 3/016 345/177 |
| 2011/0237220 | A1 | * | 9/2011 | Matsuoka ......... H04M 1/72577 455/411 |
| 2012/0161667 | A1 | * | 6/2012 | Mason ................ F21V 23/0442 315/297 |
| 2012/0206392 | A1 | * | 8/2012 | Ng ....................... G06F 3/03547 345/173 |
| 2012/0223885 | A1 |   | 9/2012 | Perez |
| 2013/0101127 | A1 | * | 4/2013 | Buchmann ........... H04R 29/005 381/58 |
| 2015/0186109 | A1 | * | 7/2015 | Jarvinen ................. G06F 3/167 715/728 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

Primary Examiner — An T Nguyen
(74) Attorney, Agent, or Firm — Lee & Hayes, PLLC

(57) ABSTRACT

A voice controlled assistant having a housing to hold one or more microphones, one or more speakers, and various computing components. The voice controlled assistant facilitates transactions and other functions primarily through verbal interactions with a user. In some situations, a transaction may require entry of a code, which the user may wish to enter in a non-verbal way. The voice controlled assistant is configured to analyze an audio signal to detect user interactions with the surface of the voice controlled assistant and to interpret the detected interactions as entry of the code.

25 Claims, 7 Drawing Sheets

VOICE CONTROLLED ASSISTANT WITH NON-VERBAL USER INPUT

BACKGROUND

Homes are becoming more connected with the proliferation of computing devices such as desktops, tablets, entertainment systems, and portable communication devices. As these computing devices evolve, many different ways have been introduced that allow users to interact with computing devices, such as through mechanical devices (e.g., keyboards, mice, etc.), touch screens, motion, and gesture. Another way to interact with computing devices is through speech.

To implement speech interaction, a device is commonly equipped with a microphone to receive voice input from a user and a speech recognition component to recognize and understand the voice input. The device also commonly includes a speaker to emit audible responses to the user. With speech interaction, the device may be operated essentially "hands free".

For some operations, however, voice interaction may not be intuitive or easily implemented. Additionally, in some contexts, audio exchanges may not be appropriate for the desired user experience. For instance, suppose the user is conducting a transaction or engaging in an exchange that involves sharing private information, such as a personal identification number (PIN), social security number (SSN), or the like. In these cases, a pure audio exchange may not be suitable, particularly if the user does not wish to verbally share the private information while other people are in the same vicinity.

Accordingly, there is a continuing need for improved designs of voice enabled devices that are intuitive and easy to operate and yet provide different forms of exchanges to accommodate and enhance various user experiences.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
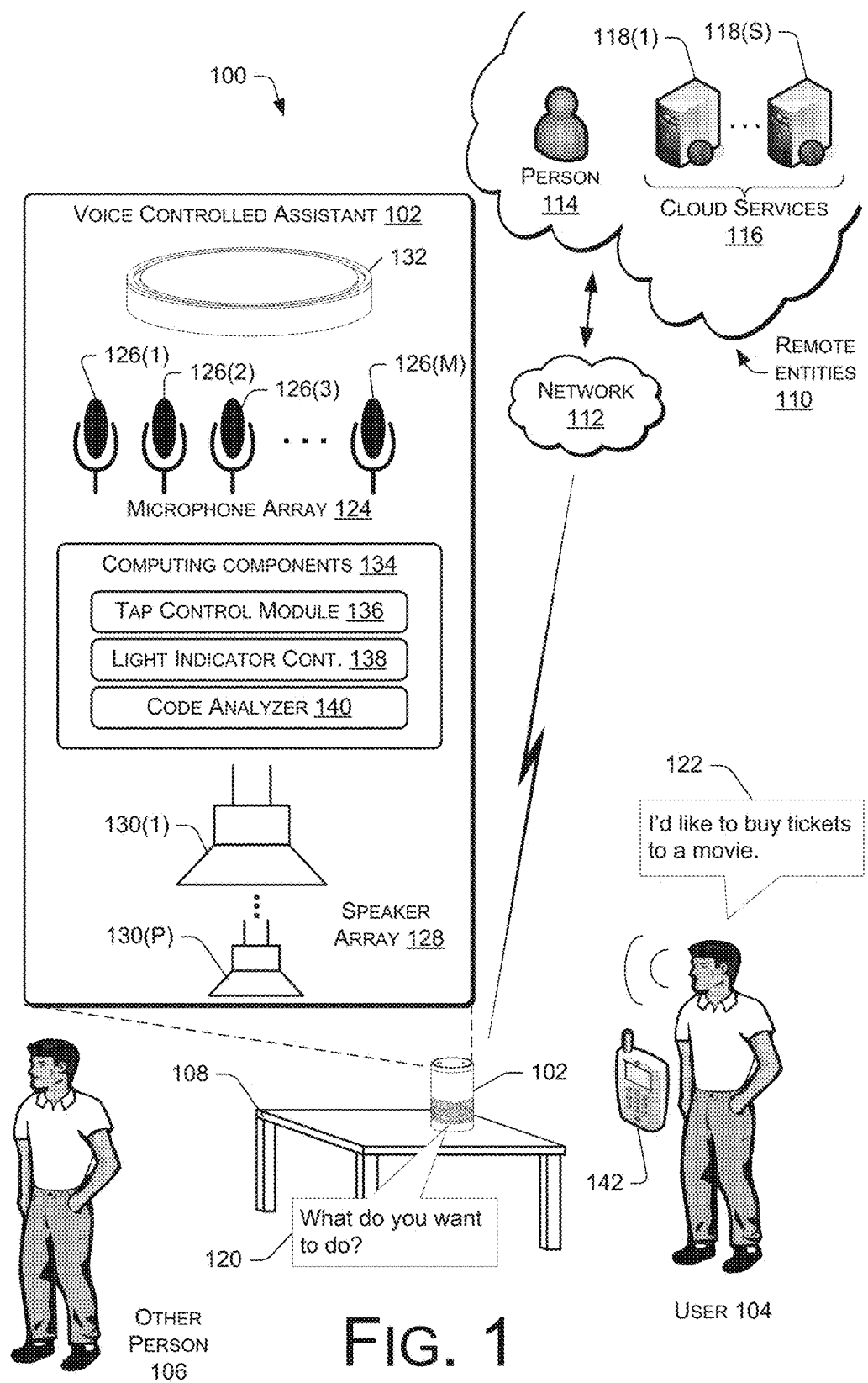
FIG. 1 shows am example of an illustrative environment including a voice controlled assistant and a local user.

A voice controlled assistant having an integrated microphone array is described, along with techniques for non-verbal code entry. The voice controlled assistant is discussed in the context of an architecture in which the assistant is connected to client devices operated by remote users (i.e., far end talkers) or a network accessible computing platform, or "cloud service", via a network. The voice controlled assistant may be implemented as a hands-free device equipped with a wireless LAN (WLAN) interface. The voice controlled assistant relies primarily, if not exclusively, on voice or other audible interactions with a user. However, for certain operations and certain situations, verbal code entry is inappropriate and the voice controlled assistant, described herein, is configured to interpret directional taps or other nonverbal sounds as inputs.

To illustrate one example usage scenario, the voice controlled assistant may be positioned in a room (e.g., at home, work, store, etc.) to receive user input in the form of voice interactions, such as spoken requests or a conversational dialogue. Depending on the request, the voice controlled assistant may perform any number of actions or functions. For instance, the assistant may play music or emit verbal answers to the user. The assistant may alternatively function as a communication device to facilitate network voice communications with a far end talker. As still another alternative, the user may ask a question or submit a search request to be performed by a remote cloud service. For instance, the user's voice input may be transmitted from the assistant over a network to the cloud service, where the voice input is interpreted and used to perform a function. In the event that the function creates a response, the cloud service transmits the response back over the network to the assistant, where it may be audibly emitted to the user.

When using speech as the primary interaction, the user may encounter situations when the hands-free device is not as intuitive or easy to operate as might be expected or desired. For instance, suppose the user is in the midst of a conversation using the voice controlled assistant and the user would like to adjust the volume of the audio output. In a purely voice controlled mode of operation, the device expects to receive the command vocally. However, it may be difficult for the device to differentiate between words in the conversation and a volume control command. To alleviate this potential confusion, the voice controlled assistant is configured to interpret non-verbal cues, such as directional taps on the surface of the voice assistant, as one or more user adjustments. For instance, the voice controlled assistant may be equipped with a microphone array, which is capable of discerning a direction or general location upon which the voice controlled assistant is tapped. Thus, the voice controlled assistant may be configured to discern between a tap near the top of the device and a tap near the bottom of the device and to increase the volume in response to a tap near the top of the device and to decrease the volume in response to a tap near the bottom of the device. Thus, in one implementation, the user may control the volume by tapping various designated locations on the voice controlled assistant while still conducting the verbal conversation.

In another example scenario, the voice controlled assistant may be used to engage in transactions, such as financial or sale transactions. Suppose, for example, the user employs the voice controlled assistant to engage in an e-commerce transaction or an online banking transaction. In such situations, as part of the transaction, the user may be asked to enter a code, such as a personal identification number (PIN), social security number (SSN), driver's license, account number, verification identifier, credit card number and so forth. Verbal entry of this code may not be suitable in some situations where privacy is a concern, such as when other people are near the user. Accordingly, the voice controlled assistant is used to facilitate non-verbal entry of the code. For instance, the voice controlled assistant may designate zones or areas representing numerical values, such as 0-9, located around the top of the device. The voice controlled assistant may be further configured to detect and interpret taps within each of the zones as user entry of the corresponding value. Thus, the user is able to enter the code through a series of taps on the top surface of the voice controlled assistant (e.g., a tap in zone 1 enters the numerical value 1, a tap in zone 2 enters a 2, and so forth).

Furthermore, in some contexts, the voice controlled assistant may need to communicate the zone indications or designations to the user. For instance, the user may enter a numerical code, while in other situations; the user may enter one or more alphabetic characters. Accordingly, the voice controlled assistant may be further constructed with light indicators to convey zone designations (i.e., the value of the zone) to the user. In other instances, the number or size of various zones may change depending on the number of possible entry characters.

In other example scenarios, the user may be entering an activation or pass code to gain entry or usage of the voice controlled assistant and the voice controlled assistant may be configured to detect a series of non-verbal cues or taps on the top of the device and to unlock when the correct pattern is entered (for example, a sequence such as top-bottom-left-left). In this scenario, the voice controlled assistant may be configured to orient the zones of the device based on an original tap. For example, the voice controlled assistant may set the area around the original tap as a top zone, and based on the placement of the original tap orientate the other zones around the top surface of the voice controlled assistant. In this way the user is able to configure the input controls of the voice controlled assistant based on his/her relative position and, in some cases, to enter code patterns without the need for a visual designation of the zones, as described above. In other instances, the voice controlled assistant may designate values based on a directional relationship of the taps to the original tap. For example, a tap placed anywhere below the original tap may be designated as bottom, while a tap to the left of the original tap may be designated as left and so forth. In this manner, the voice controlled assistant may receive the code without communicating zones to the user.

FIG. 1 shows am example of an illustrative environment 100 including a voice controlled assistant 102 and a local user 104. In this example, a user 104 is present in the environment 100 (such as a room or an office) to interact with the voice controlled assistant 102 along with at least one other person 106 capable of listening to the conversation of the user 104 and the voice controlled assistant 102.

In this illustration, the voice controlled assistant 102 is physically positioned on a table 108 within the environment 100. The voice controlled assistant 102 is shown sitting upright and supported on its base end. In other implementations, the assistant 102 may be placed in any number of locations (e.g., ceiling, wall, in a lamp, beneath a table, on a work desk, in a hall, under a chair, etc.). The voice controlled assistant 102 is shown communicatively coupled to remote entities 110 over a network 112. The remote entities 110 may include individual people, such as a person 114, or automated systems (not shown) that serve as far end talkers to verbally interact with the user 104. The remote entities 110 may alternatively comprise cloud services 116 hosted, for example, on one or more servers 118(1), ..., 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 102, and produce a suitable response. Example applications might include web browsing, online shopping, banking, bill payment, email, work tools, productivity, entertainment, educational, and so forth.

In FIG. 1, the user 104 is shown communicating with the remote entities 110 via the voice controlled assistant 102. In the illustrated scenario, the voice controlled assistant 102 outputs an audible question, "What do you want to do?" as represented by dialog bubble 120. This output may represent a question from a far end talker 114, or from a cloud service 116 (e.g., an entertainment service). The user 104 is shown replying to the question by stating, "I'd like to buy tickets to a movie" as represented by the dialog bubble 122. In some implementations, the voice controlled assistant 102 is equipped with a text-to-speech (TTS) engine that generates voice audio output from text-based content received from the remote entities 110. This TTS engine may, in other implementations, be located at the remote entities 110 to convert the text content to an audio output signal, which is then transmitted to the voice controlled assistant 102.

The voice controlled assistant 102 is equipped with an array 124 of microphones 126(1), ..., 126(M) to receive the voice input from the user 104 as well as to detect taps or other non-verbal cues on various locations of the voice controlled assistant 102. The microphones 126(1)-(M) are generally arranged at a first or top end of the assistant 102 opposite the base end seated on the table 108, although the microphones 126(1)-(M) may be positioned in other arrangements such as along the vertical sides of the voice controlled assistant. In other implementations, the assistant 102 may be embodied with only one microphone or may include multiple microphone arrays 124.

The voice controlled assistant 102 may further include a speaker array 128 of speakers 130(1), ..., 130(P) to output sounds in humanly perceptible frequency ranges. The speakers 130(1)-(P) may be configured to emit sounds at various frequency ranges, so that each speaker has a different range. In this manner, the assistant 102 may output high frequency signals, mid frequency signals, and low frequency signals. The speakers 130(1)-(P) are generally arranged at a second or base end of the assistant 102 and positioned to emit the sound in a downward direction toward the base end and opposite to the microphone array 124 in the top end. Although multiple speakers are illustrated, the assistant 102 may be embodied with only one speaker in other implementations.

The voice controlled assistant 102 may further include a light indicator 132 to provide non-audio, visual indications to the user. In one implementation, the light indicator 132 is integrated with the top surface of the voice controlled assistant 102 to permit viewing from all directions. In some implementations, the light indicator 132 may be configured with multiple LEDs to provide multiple light segments which can be actively controlled to exhibit essentially any color, sequence, effect or character. Generally, the light indicator 132 may be used to provide visual cues or feedback to the user, such as tapping zone designations and values.

In some implementations, various functions or activities may be programmatically associated with different indication or appearance states of the light indicator 132. For instance, the light indicator 132 may take on a first appearance (e.g., numerical values) when the user 104 is entering a numerical code and a second appearance (e.g., alphabetic characters) when the user 104 is entering a word or pass phrase. In one particular example, the light indicator 132 may be configured to provide a pattern of colors corresponding to zone designations around the top of the voice controlled assistant 102. In such configurations, a code may be color based, such as a sequence of colors (e.g., Yellow-Red-Blue-Green) and may be entered by the user tapping the corresponding color zones in the correct sequence. Other examples of possible events that may be assigned to various appearances of the light indicator include alerts, reminders, calendar events, call waiting, arrival of a message (e.g., voicemail, email, text, etc.), mute on/off, recording active, security event (e.g., detecting a presence of an intruder through audible sound), amplitude of speaker's voice, direction of voice source, power, connection to a Wi-Fi network, weather (e.g., temperature, pressure, etc.), timer, and so forth.

The voice controlled assistant 102 may further include computing components 134 that process the voice and non-verbal, tap, inputs detected by the microphone array 124, enable communication with the remote entities 110 over the network 112, and generate the audio to be output by the speaker array 128. The computing components 136 are generally positioned between the microphone array 124 and the speaker array 128, although essentially any other arrangement may be used.

Among the computing components 134 are a tap control module 136, a light indicator controller 138, and a code analyzer 140. The tap control module 136 receives an audio signal from the microphone array 124, analyzes the audio signal and performs one or more operations based on taps detected.

The light indicator controller 138 controls operation of the light indicator 132. More specifically, the light indicator controller 138 programmatically designates various different indications which the light indicator 132 can exhibit. If the light indicator 132 is a multi-color, multi-segment indicator, the controller 138 may further determine which segments to illuminate, which colors to use, a timing to illuminate the segments, and whether to follow a pattern, sequence, or animation.

The code analyzer 140 receives an audio signal from the microphone array 124, analyzes the audio signal and interprets a code from detected taps. In some implementations, the code analyzer 140 provides the code to the remote entities that requested a confirmation or assess the entered code for local verification or confirmation. In other implementation, the code analyzer 140 may translate the taps into a control signal for controlling any number of aspects, such as volume, treble, base, radio band selection, menu navigation, and so forth.

In some example scenarios, the code may be a value or identifier that is pre-known to the user 104, such as a telephone number, address, social security number, driver's license, PIN, and so forth. Alternatively, the code may be a transaction-based temporary identifier that is unknown to the user 104, but provided during the transaction. For instance, in another implementation, the user 104 may have an associated computing or communication device 142 (e.g., smart phone, PDA, tablet, laptop, etc.) that runs an application to facilitate operation of the voice controlled assistant 102. As part of a transaction, the remote entities 110 may send a transaction code to the application on the associated device 142. The user 104 can then read the code in privacy and enter the code by tapping on the voice controlled assistant 102 to confirm the transaction.

To continue our example, suppose the user 104 orders the movie ticket and in response receives, on his/her personal device 142, a code of 5-9-3 to confirm purchase of a movie ticket. The light indicator controller 138 may cause the voice controlled assistant 102 to illuminate a number of numerical zones, 0-9, to the user 104 using the light indicator 132, as illustrated with respect to FIG. 2 below. The user 104 may then enter the code 5-9-3 by tapping on zone 5, zone 9 and zone 3 in order to complete the transaction.

Figure 2:
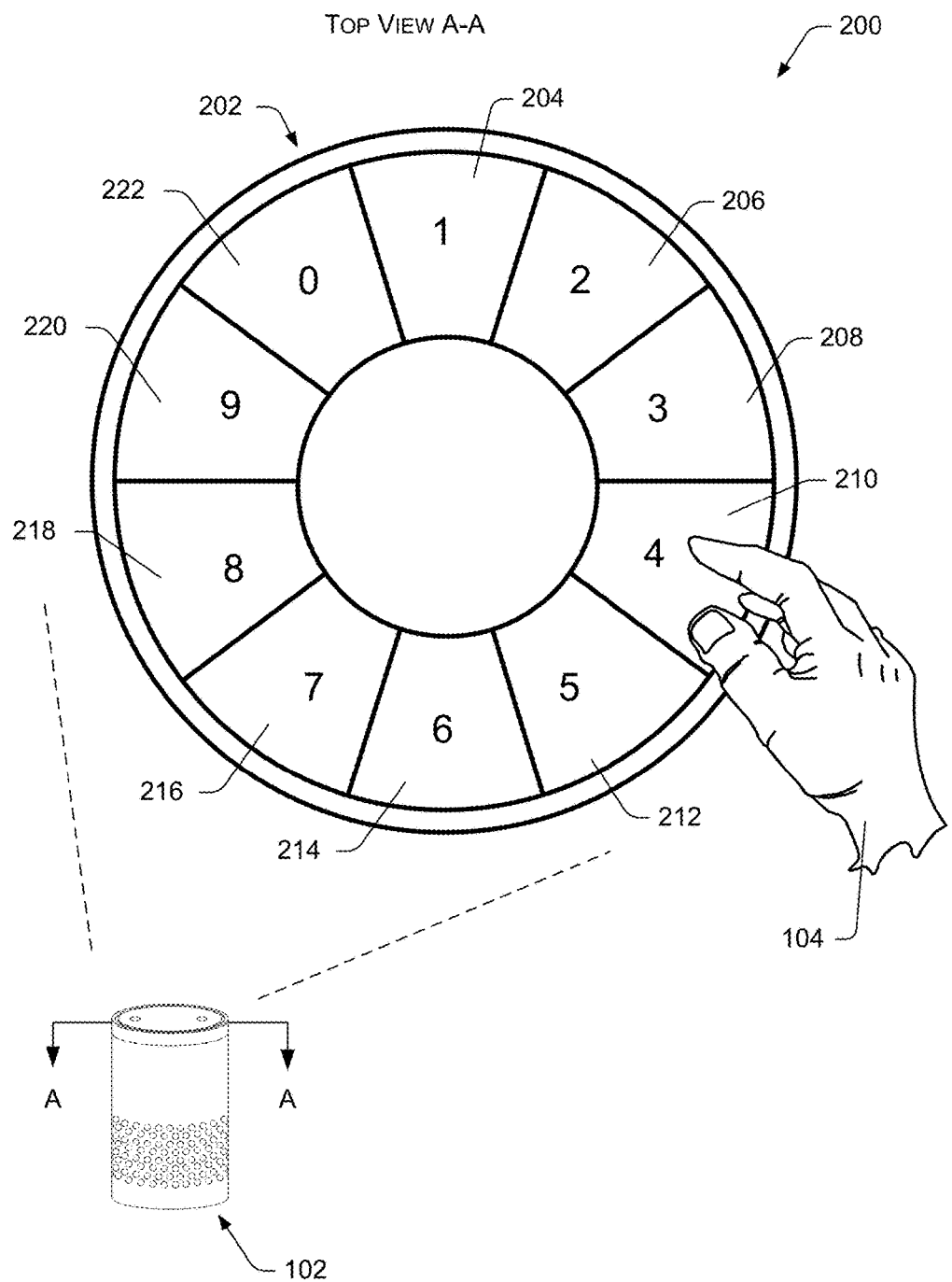
FIG. 2 shows an example usage scenario of the user entering a code by tapping on the voice controlled assistant.

FIG. 2 shows an example usage scenario of the user 104 entering a code by tapping on the voice controlled assistant 102. The voice controlled assistant 102 is illustrated with in a top down view taken along line A-A. In the illustrated example, ten zones 204-222 are illuminated on the top surface 202 of the voice controlled assistant 102 for aiding the user 104 in entering numerical codes.

For instance, the user 104 may engage in a financial or sale transaction via the voice controlled assistant 102. During the transaction, the user 104 may need to provide a credit card number or other verification code, such as an account number, before the transaction can be completed. As discussed above, verbal entry of the credit card or account number may not be suitable in some situations, such as the environment 100 of FIG. 1, where other people are near the user 104 and privacy is a concern. Accordingly, the voice controlled assistant 102 is used to facilitate nonverbal code entry.

For instance, in the illustrated example, the voice controlled assistant 102 is equipped with light indicators which the voice controlled assistant 102 may utilize to designate tapping zones or areas and/or the value of each zone to the user 104. As illustrated, the voice controlled assistant 102 has illuminated ten zones 204-222 representing numerical values 0-9 radially around the top surface 202 of the voice controlled assistant 102. The voice controlled assistant 102 is further equipped with at least one microphone or microphone array to capture the taps of the user 104 on the voice controlled assistant 102.

As the taps are captured by the microphones, the voice controlled assistant 102 is able to detect and interpret the taps as entry of the designated value, for example, by utilizing time-of-arrival localization techniques. In this instance, the voice controlled assistant 102 is equipped with a microphone array. As the microphones of the microphone array capture sound, the voice controlled assistant 102 isolates the tap in the audio signal provided by each of the microphones and determines the time at which the tap was recorded. Using the times of capture and known location of each of the microphones, the voice controlled assistant 102 can determine a substantial direction of the tap and locate it spatially within one of the ten zones 204-222.

Additionally, in some implementations, the voice controlled assistant 102 may be equipped with a single Omni-directional microphone, multiple microphone arrays or one or more directional microphones and be configured to utilize various acoustic location techniques to determine the zone 204-222 which the user taps. For example, the voice controlled assistant 102 may be configured to utilize passive acoustic location techniques, beamforming, triangulation and/or spectral analysis to determine the location of the taps and the value that the user 104 entered. In one specific implementation, machine learning and model training techniques may be utilized to train the voice controlled assistant 102 to detect taps associated with a particular user, such as user 104, and/or to detect certain patterns or series of taps which may be predefined by the user 104 prior to entry.

Once the enter code is entered, the voice controlled assistant 102 may need to confirm the entry with the user 104. In this situation, the voice controlled assistant 102 may be configured to flash or illuminate the zones 204-222 in the order entered by the user 104 and to allow the user to re-enter the code if an error is detected.

Figure 3:
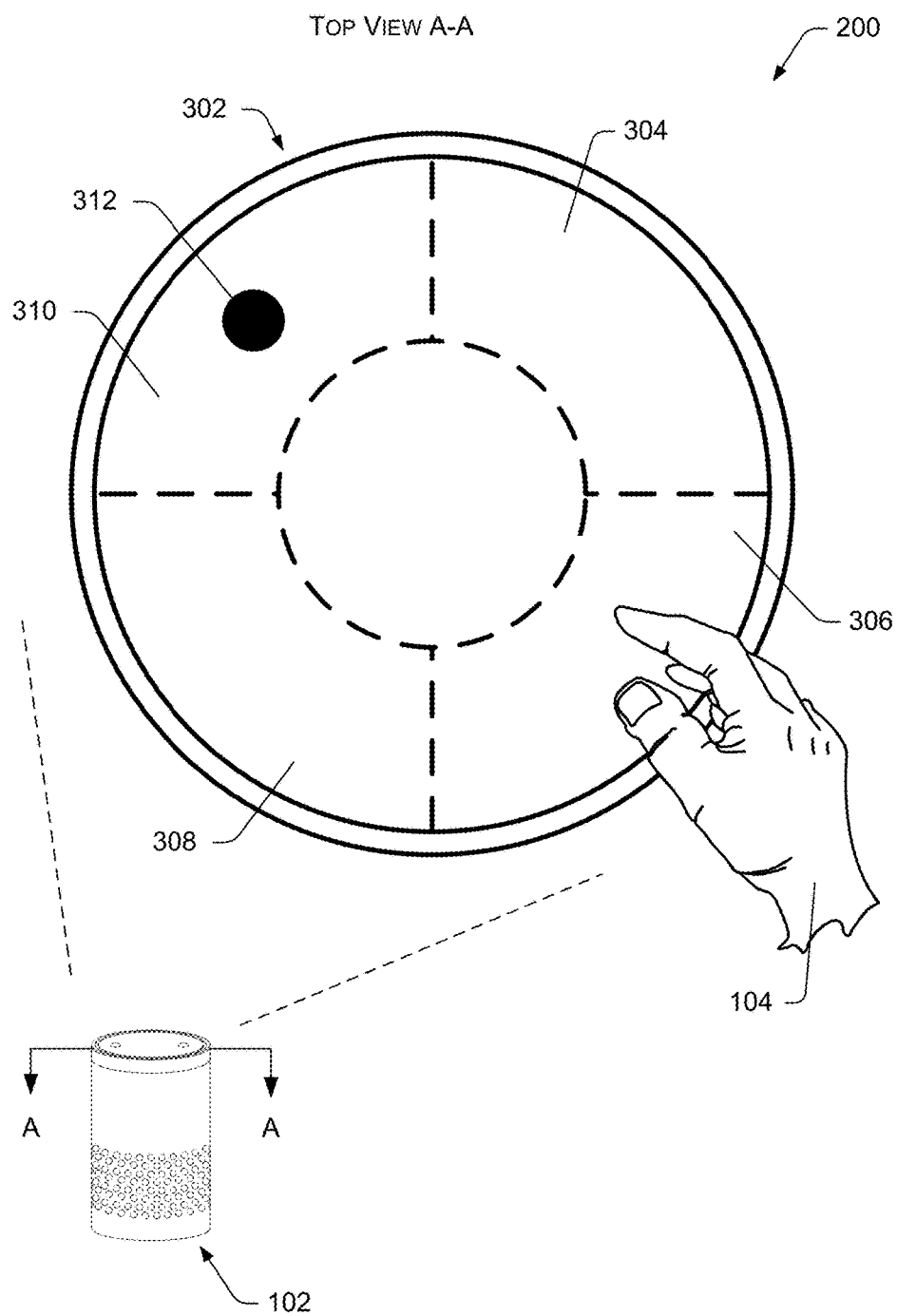
FIG. 3 shows another example usage scenario of the user entering a code by tapping on the voice controlled assistant.

FIG. 2 provides one example usage scenario in which the user 104 is able to enter a numerical code, such as a credit card or bank account number, by tapping on the top surface of the voice controlled assistant 102. FIG. 3 provides another usage scenario in which the user may enter a code, orient the device and/or unlock the voice controlled assistant 102 by tapping in a predetermined sequence on the top surface of the voice controlled assistant 102.

FIG. 3 shows another example usage scenario of the user 104 entering a code by tapping on the voice controlled assistant 102. As in FIG. 2, the voice controlled assistant 102 is illustrated with in a top down view taken along line A-A. However, in this example, the voice controlled assistant 102 has not illuminated any zones or areas. Rather, in this usage scenario, the voice controlled assistant 102 may be asleep due to a long period of inactivity or otherwise locked and the user 104 is entering a wake up code or command by tapping a predetermined sequence on the top surface 302 of the voice controlled assistant 102.

In some implementations, the voice controlled assistant 102 may be configured to interpret taps as being entered in one of four zones 304, 306, 308 or 310. In this scenario, the user 104 is tapping zone 306. If this is the first tap by the user 104, the voice controlled assistant 102 may interpret the tap as the first entry in an unlock or wake up code and orient the values of the other zones 304, 308 and 310 based on the location of zone 306. For example, the voice controlled assistant 102 may designate zone 306 as a "bottom" zone (i.e., the zone closest to the user 104), and the other zones as "left," "right" and "top" based on their relationship to zone 306. For instance, the voice controlled assistant 102 may designate zone 308 as "left," zone 304 as "right" and zone 310 as "top." In this way the user 104 is able to configure the input controls of the voice controlled assistant 102 based on his/her relative position. In some instances, the zones "top," "bottom," "left" and "right" may correspond to numerical values such as 0-4, while in other instances the zones may correspond to color values such as "blue," "green," "yellow" and "red".

In other examples, the voice controlled assistant 102 may include a mark 312 or other permanent designation on the top surface 302 for use by the user 104 to orient him/her self with the voice controlled assistant 102. For example, one of the zones 304-310 may be a different color to designate the "top" zone. In the illustrated example, zone 312 is designated as "top" by a round circular mark 312. In other instances, the voice controlled assistant 102 may include markers that the user 104 may position on the voice controlled assistant 102, for example, during set up to designate one or more zones or controls associated with a particular tap.

In other implementations, the voice controlled assistant 102 may designate value of taps following the original tap based on a directional relationship to the original tap in zone 306 without the need for actual zone designations. For example, a tap placed anywhere above the original tap may be designated as entry of a "top", while a tap to the left of the original tap may be designated as entry of a "left." In this implementation, the voice controlled assistant may receive the code without communicating zone designations to the user 106.

Figure 4:
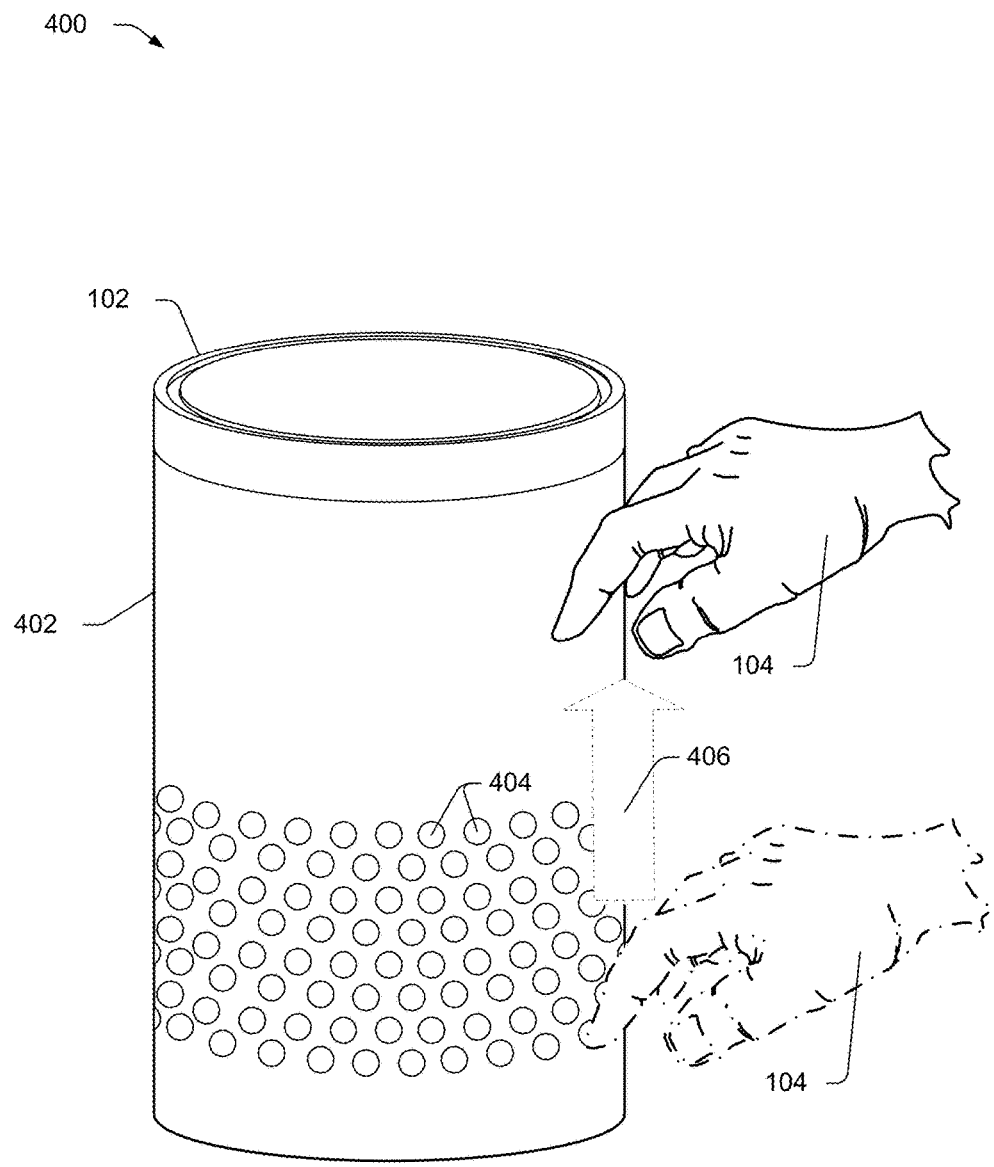
FIG. 4 shows an example usage scenario of the user entering an input command by tapping the voice controlled assistant.

FIGS. 2 and 3 provide examples of entering code values by tapping on the top surface of the voice controlled assistant 102. FIG. 4 provides an example usage scenario in which the user 104 interacts with the side of the voice controlled assistant 102 to adjust the volume.

FIG. 4 is an example usage scenario of the user 104 entering an input command by interacting with the voice controlled assistant 102. As illustrated, the voice controlled assistant 102 has a cylindrical body or housing 402 with an upper or top end and a lower or base end. The base end of the housing 402 has multiple openings or apertures 404 to permit passage of sound waves to the microphones and from the speakers contained within the housing 402. In other implementations, the openings 404 may be in other locations, such as a band about the middle of the cylindrical housing or closer to the top end. The openings 404 may be arranged in any layout or pattern, essentially anywhere on the device, depending in part on the location of the one or more speakers housed therein.

In this example scenario, the user 104 is adjusting the volume of the voice controlled assistant 102 by running a hand up the side of the housing 402 along path 406. For instance, the voice controlled assistant 102 may be configured to detect the sound associated with the movement of the hand of user 104 up and down the housing 402 and to interpret those sounds as a command to increase or decrease the volume level. For example, a sound of the hand moving up the side of the housing 402 has a different signature than the sound of the hand moving down the side of the housing 402. Thus, the voice controlled assistant 102 may be configured with one or more models, which may be used to detect and distinguish between the sound signatures of the hand moving up or down the side of the housing 402.

Further, in some implementations, the user 104 may train the voice controlled assistant 102 as to the sound signature associated with increasing the volume and the sound signature of decreasing the volume. For instance, during set up or configuration the voice controlled assistant 102 may ask the user 104 to repeatedly make a sound by touching, tapping or sliding his/her hand on the housing 402 which the voice controlled assistant 102 may associate with a command to increase the volume. In this manner, the user 104 is able to train the voice controlled assistant 102 to the sound signatures, which the user 104 desires to utilize as control sounds.

Figure 5:
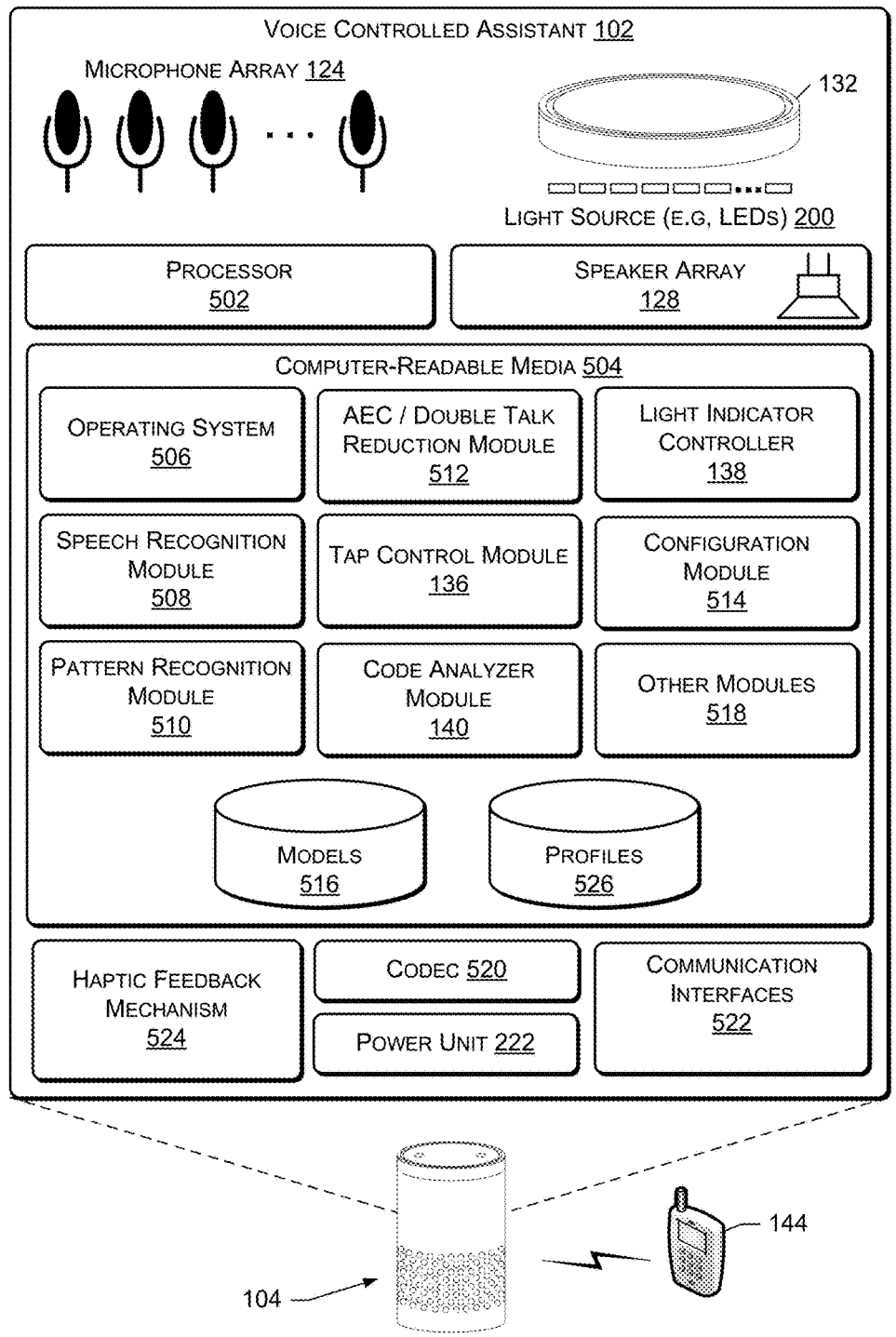
FIG. 5 shows an example architecture of the voice controlled assistant of FIGS. 1-4.

FIGS. 1-4 provide an example environment and example usage scenarios for using a voice controlled assistant 102 equipped with a microphone or microphone array to detect taps and interpret the taps as an input. FIG. 5 illustrates select functional components of the voice controlled assistant 102 in more detail.

FIG. 5 shows an example architecture of the voice controlled assistant 102 of FIGS. 1-4. Generally, the voice controlled assistant 102 may be implemented as a standalone device that is relatively simple in terms of functional capabilities with limited input/output components, memory, and processing capabilities. For instance, the voice controlled assistant 102 may not have a keyboard or keypad. Nor does it necessarily have a display or touch screen to facilitate visual presentation and user touch input. Instead, the assistant 102 may be implemented with the ability to receive and output audio, a network interface (wireless or wire-based), power, and limited processing/memory capabilities.

In the illustrated implementation, the voice controlled assistant 102 includes the microphone array 124, the speaker array 128, a light indicator 132 as described above with respect to FIG. 1. The microphone array 124 may be used to capture speech input from the a user, or other sounds such as taps placed on or around the voice controlled assistant 102. The speaker array 128 may be used to output speech from a far end talker, audible responses provided by the cloud services, forms of entertainment (e.g., music, audible books, etc.), or any other form of sound. The speaker array 128 may output a wide range of audio frequencies including both human perceptible frequencies and non-human perceptible frequencies. The light indicator 132 provides visual, non-audio feedback to the user, such as various code entry zone designations. In the illustrated implementation, the light indicator 132 includes a light source 200. The light source 200 may be comprised of one or more light emitting diodes (LEDs), which may be used to display various alpha-numeric characters to the user.

The voice controlled assistant 102 further includes a processor 502 and computer-readable media 504. The processor 502 may be implemented as any form of processing component, including a microprocessor, control logic, application-specific integrated circuit, and the like. The computer-readable media 504 may include computer-readable storage media ("CRSM"), which may be any available physical media accessible by the processor 502 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 502.

Several modules such as instruction, datastores, and so forth may be stored within the computer-readable media 504 and configured to execute on the processor 502. For example, an operating system module 506 is configured to manage hardware and services (e.g., wireless unit, USB, Codec) within and coupled to the voice controlled assistant 102 for the benefit of other modules. Several other modules may be provided to process verbal input from the user. For instance, a speech recognition module 508 provides some level of speech recognition functionality. In some implementations, this functionality may be limited to specific commands that perform fundamental tasks like waking up the device, configuring the device, and the like. The amount of speech recognition capabilities implemented on the voice controlled assistant 102 is an implementation detail, but the architecture described herein can support having some speech recognition at the local voice controlled assistant 102 together with more expansive speech recognition at located in cloud services.

In addition to speech recognition module 508, a pattern recognition module 510 provides some level of pattern recognition functionality. For instance, this functionality may be limited to detecting specific patterns, which act as commands to perform fundamental tasks like waking up, or unlocking the voice controlled assistant 102, as well as, non-verbal alphanumerical character, password or code entry. For example, the pattern recognition module 510 may be configured to detect taps within the audio signal captured by the microphone array 124 placed along the top or sides of the voice controlled assistant 102. Similar to the speech recognition module 508, the amount of pattern recognition capabilities implemented on the voice controlled assistant 102 is an implementation detail, but the architecture described herein can support having some pattern recognition at the local voice controlled assistant 102 together with more expansive pattern recognition located in cloud services.

In some implementations, an acoustic echo cancellation (AEC) and double talk reduction module 512 are provided to process the audio signals to substantially cancel acoustic echoes and substantially reduce double talk that may occur. This module 512 may, for example, identify times where echoes are present, where double talk is likely, where background noise is present, and attempt to reduce these external factors to isolate and focus on sound generated by the user. By isolating on the sound generated by the user, better signal quality is provided to other modules, such as the speech recognition module 508 and the pattern recognition module 510, to enable more accurate interpretation of the speech utterances and non-verbal cues.

One or more tap control module 136 may also be stored in the computer-readable media 504 to modify operation or functionality of the voice controlled assistant 102 and/or one or more corresponding applications or systems jointly operating with or otherwise connected to the voice controlled assistant 102 based on the taps detected by the pattern recognition module 512. For example, the tap control module 136 may include multiple modules that facilitate volume control, other audio control (e.g., base, treble, etc.), menu navigation, radio band selection, power on and off, track selection, pause and so forth.

A code analyzer module 140 is also shown implemented as a software or firmware module stored in the computer-readable media 504 for execution on the processor 502. Similar to the tap control module 136, the code analyzer module 140 receives data from the pattern recognition module 512. The code analyzer module 140, however, interprets the detected taps as values or portions of a character entry. For example, as shown in FIG. 2, the user may enter a numerical code or credit card number by tapping the code into the corresponding zones. The pattern recognition module 512 is then able to determine that the taps were entered and provide the taps to the code analyzer module 140, which analyzes the taps to determine the word, phrase, or code entered by the user. Further, as the user taps on the surface of the voice controlled assistant 102 at particular positions or zones, the code analyzer 140 is able to analyze the taps and the location in the context of the why the code is being used, i.e. the code analyzer module 140 is able to determine whether or not the code entered is valid. In some cases, the code analyzer 140 may verify the code locally, send the code to one or more remote entities for verification or perform partial verification locally and send the code to the remote entities for partial verification.

The light indicator controller 138 may also be implemented to execute on the processor 502 to assign various functions to corresponding indication states exhibited by the light indicator 132. More specifically, the light indicator controller 138 individually controls each of the LEDs 200 to provide any number of visual appearances for the light indicator 132. The light indicator controller determines which of the LEDs 200 to illuminate, when individual LEDs should be illuminated. For example, the light indicator controller 138 may determine which LEDs 200 to illuminate to designate and label tap zones for manual input entry by the user, such as the numerical zones described above with respect to FIG. 2.

In some implementations, the computer-readable media 504 may also store a configuration module 514. The configuration module 514 may allow the user to train or generate one or more pattern models 516, which may be associated with one or more command, which may be carried out by the tap control module 136. A pattern model 516 is a collection of acoustic characteristics associated with a specific noise or sound which the pattern recognition module 510 is able to detect in the audio signal generated by the microphone array 124. The voice controlled assistant 102 may ship with one or more models 516, which were trained in a lab and/or the user may generate or train additional models 516 to customize the voice controlled assistant 102 to his/her needs. For example, during an initial set up or configuration stage the configuration module 514 may cause the speakers 102 to ask the user to repeatedly make a sound by touching, tapping or sliding his/her hand on the housing 402, which the voice controlled assistant 102 may store as a pattern model 516 and associate with a command to increase the volume. In this manner, the user is able to train the voice controlled assistant 102 to recognize sound signatures particular to the user and to respond to each sound signature in a customized fashion.

The modules shown stored in the computer-readable media 504 are merely representative. Other modules 518 may also be stored for processing the user voice input, interpreting the tap or sound inputs, and/or performing functions based on the audio signal capture by the microphone array 124.

The voice controlled assistant 102 might further include a codec 520 coupled to the microphones of the microphone array 124 and the speakers of the speaker array 128 to encode and/or decode the audio signals. The codec 520 may convert audio data between analog and digital formats. The user may interact with the assistant 102 by speaking to it or tapping on it. The codec 520 encodes the user speech or taps and transfers that audio data to other components. In some implementations, the voice controlled assistant 102 can communicate back to the user by emitting audible statements passed through the codec 520 and output through the speaker array 128. In this manner, the user interacts with the voice controlled assistant simply through speech, without use of a keyboard or display common to other types of devices.

The voice controlled assistant 102 may include one or more communication interfaces 522 to facilitate communication between one or more networks (such as network 112 of FIG. 1) and/or one or more cloud services (such as cloud service 116 of FIG. 1). The communication interfaces 522 may also facilitate communication between one or more wireless access points, a master device and/or one or more other computing devices as part of an ad-hoc or home network system. The communication interfaces 522 may be used to communicate with other local devices and may support both wired and wireless connection to various networks, such as cellular networks, radio, WiFi networks, short-range or near-field networks (e.g., Bluetooth®), infrared signals, local area networks, wide area networks, the Internet, and so forth. As one example, a voice communication device 144 may be proximal to the voice controlled assistant 102 and communicate with the assistant 104 using a Bluetooth® connection. For example, when the communication device 144 receives a call, the call may be transferred to the voice controlled assistant 102 to facilitate the conversation with the user.

In some particular implementations, the voice controlled assistant 102 may further be equipped with a haptic feedback mechanism 524, which provides touch perceivable feedback to the user. As one example implementation, the haptic feedback mechanism 524 may be configured to indicate to a user when a tap has been detected by the pattern recognition module 510. For example, each tap detection may be communicated to the user by a corresponding vibration.

In one implementation, user profiles 526 may be maintained in the computer-readable media 504. The user profiles 526 may include a user name, an identifier, an email address, a phone number, PIN, parental controls, one or more models 516 linked with particular input patterns associated with the user and the like. The information in the user profiles 526 may be used by the code analyzer 140 to confirm the code and/or the tap control module 136 to process a command. For example, each user of the voice controlled assistant 102 may have different user or parental rights and a unique wake up pattern. The voice controlled assistant 102 may be configured to recognize the user based on the wake up pattern entered and only allow financial transactions to be completed if the associated user profile 526 has parental rights.

The voice controlled assistant 102 is designed to support audio interactions with the user, in the form of receiving voice commands and tap inputs from the user and outputting audible feedback to the user. Accordingly, in the illustrated implementation, there are no keypads, joysticks, keyboards, touch screens, and the like. Further there is no display for text or graphical output. In one implementation, the voice controlled assistant 102 may include a few control mechanisms, such possibly power, reset or mute button. But, otherwise, the voice controlled assistant 102 relies primarily on audio interactions.

Accordingly, the assistant 102 may be implemented as an aesthetically appealing device with smooth and rounded surfaces, with apertures for passage of sound waves (as described above with respect to FIG. 4), and merely having a power cord and optionally a wired interface (e.g., broadband, USB, etc.). In some implementations, a power light may be included at the base or bottom of the assistant 102 to indicate when the device is powered on. An on/off power switch may further be included in some configurations.

Figure 6:
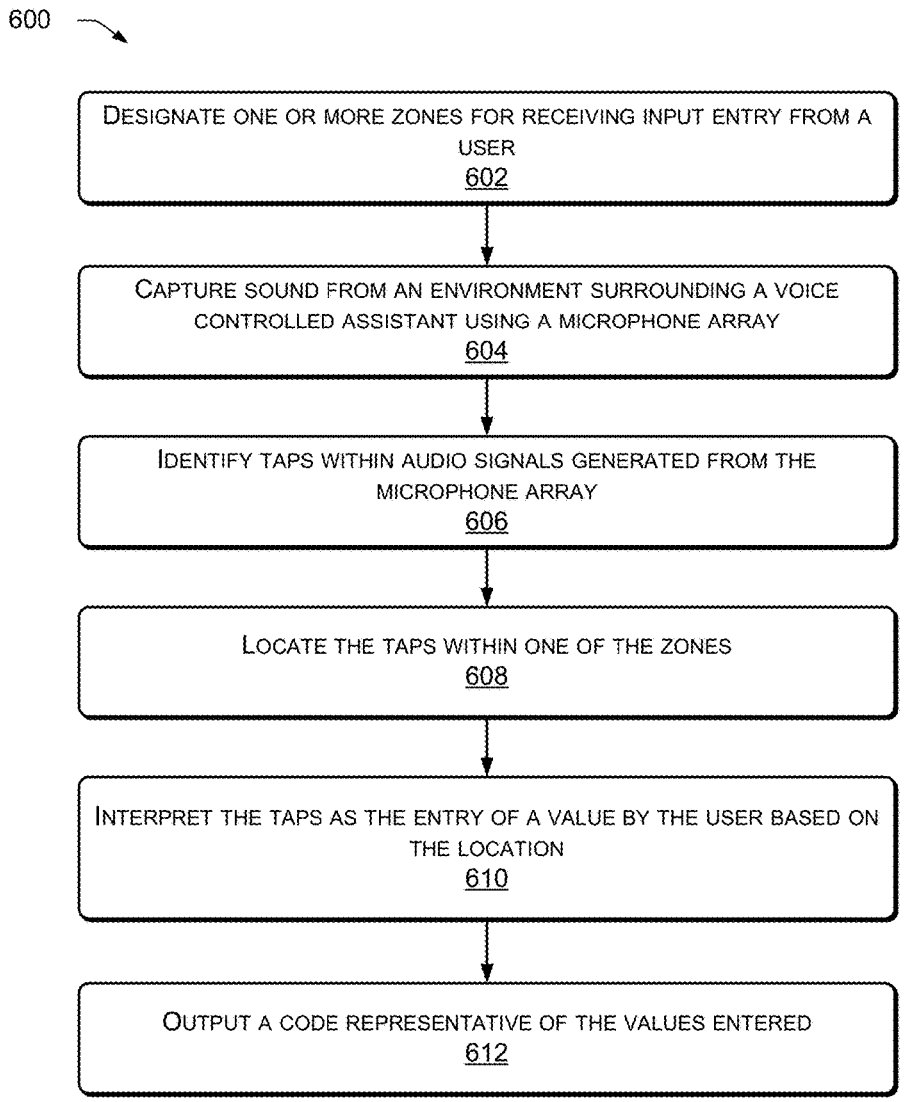
FIG. 6 is a flow diagram showing an illustrative process for entering a code into the voice controlled assistant of FIG. 1.
Figure 7:
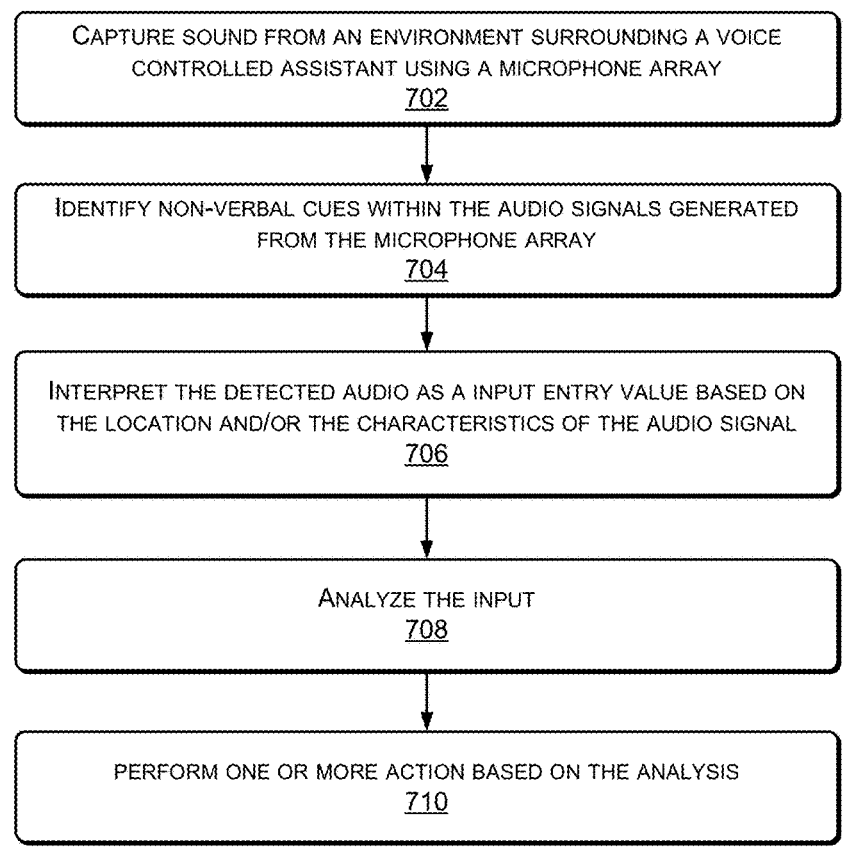
FIG. 7 is a flow diagram showing an illustrative process for entering a command into the voice controlled assistant of FIG. 1.

FIGS. 6 and 7 are flow diagrams illustrating example processes for implementing user non-verbal audio input. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is a flow diagram showing an illustrative process 600 for entering a code into the voice controlled assistant

102 of FIG. 1. At 602, a voice controlled assistant designates one or more zones for receiving input entry from a user, such as user 104. For example, the user may be purchasing online merchandise and need to enter a credit card number. However, as discussed above, in some cases verbal entry of the credit card number is inappropriate, such as when other people are nearby. Therefore, in some implementations, the voice controlled assistant may communicate zone designations to the user via one or more light indicators. In this way, the user is able to determine where to tap in order to enter the correct input values for the credit card number.

At 604, the voice controlled assistant captures sound from an environment surrounding the voice controlled assistant using a microphone array. Each of the microphones generates an audio signal representative of the sound captured which may be compared with each other to determine the location or zone upon which the user tapped.

At 606, the voice controlled assistant identifies the taps within the audio signals generated from the microphones of the microphone arrays. For example, the voice controlled assistant may apply one or more techniques to identify the taps in the audio signals and interpret the location of the tap as entry of a specific character. For instance, the voice controlled assistant may include one or more trained pattern models, which represent the acoustic characteristic related to the sound of the user tapping on the surface of the voice controlled assistant. By searching each of the audio signals for the pattern model, the voice controlled assistant is able to isolate and identify the taps from other background noise captured by the microphone array.

At 608, the voice controlled assistant locates the taps within one of the zones and interprets each tap as an entry of a specific character based on the location. For instance, the voice controlled assistant may apply techniques such as passive acoustic location, beamforming, triangulation and/or spectral analysis to determine the location of the tap upon the surface of the voice controlled assistant and, thereby, the value entered by the user.

At 610, the voice controlled assistant interprets the taps as the entry of a specific value or character based on the location determined above. For example, if the voice controlled assistant illuminated ten zones, 0-9 as described with respect to FIG. 2, the voice controlled assistant interprets a user tap within each of the zones as input of the illuminated character. In this way, the user is able to enter a code, such as the credit card number, without announcing the code to the world.

At 612, the voice controlled assistant outputs the code representative of the values entered by the user. For instance, the voice controlled assistant may provide the code to one or more remote entities for verification and/or processing. In other instances, the voice controlled assistant may perform some or all of the verification and/or processing locally.

FIG. 7 is a flow diagram showing an illustrative process 700 for entering a command into the voice controlled assistant 102 of FIG. 1. At 702, the voice controlled assistant captures sound from an environment surrounding the device using a microphone array. Each of the microphones generates an audio signal representative of the sound captured by that microphone which may be used to identify various sound patterns.

At 704, the voice controlled assistant 102 identifies non-verbal cues within the audio signals generated from the microphone array. For example, the voice controlled assistant may apply one or more techniques to identify the non-verbal cues in the audio signals and interpret the non-verbal cues as entry of a specific command or operational input. For instance, the voice controlled assistant may include one or more trained pattern models, which represent the acoustic characteristic related to specific non-verbal commands, such as volume control, power on off and sleep controls, various controls for manipulating electronic content, such as stop, pause, play, ect., among others. By searching each of the audio signals for the pattern models, the voice controlled assistant is able to isolate and identify the command associated with detected non-verbal cues from other background noise captured by the microphone array.

At 706, the voice controlled assistant analyzes the input detected. For example, in some implementations, the location and or direction of movement of the detected non-verbal cues may provide additional information for entering a command to the voice controlled assistant. For instance, as discussed above with respect to FIG. 4, the voice controlled assistant may interpret the movement of a user's hand up the side of the device as a request to increase the volume of the voice controlled assistant and the movement of the user's hand down the side of the device as a request to decrease the volume of the voice controlled assistant. In another example, the state or one or more characteristics of the voice controlled assistant (e.g., location of the device within the home) may also provide additional information for entering a user command. In this implementation, the voice controlled assistant may apply techniques such as passive acoustic location, beamforming, triangulation and/or spectral analysis to detect determine the location of non-verbal cue and/or any movement or direction associated with the non-verbal cue and, thereby, the command requested by the user.

At 708, the voice controlled assistant performs one or more actions based on the analysis. For instance, if the pattern model detected in the acoustic signals is indicative of a sliding motion on the side of the voice controlled assistant and the direction of travel is upward, the voice controlled assistant increases the volume. Likewise, if the pattern model detected in the acoustic signals is indicative of a sliding motion on the side of the voice controlled assistant but the direction of travel is downwards, the voice controlled assistant decreases the volume.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A device comprising:
   a housing comprising at least one side and a top surface, the top surface comprising a first portion associated with a first zone and a second portion associated with a second zone;
   one or more processors,
   memory;
   one or more speakers configured to output an audible prompt to enter an input via one or more taps on the top surface of the device;
   one or more microphones configured to capture audio and generate an audio signal based on the captured audio, the audio signal representing a series of taps, the series of taps comprising, in order, a first tap on the top surface of the housing and a second tap on the top surface of the housing, the first tap being at a first location in the first portion and the second tap being at a second location in the second portion;

a pattern recognition module, stored in the memory and executable by the one or more processors to analyze the audio signal generated by the one or more microphones to:
  detect, within the audio signal, the first tap and the second tap,
  determine the first location of the first tap and the second location of the second tap,
  compare a tap sequence corresponding to the first tap at the first location and the second tap at the second tap location with a predetermined tap sequence associated with the input, and
  determine that the tap sequence corresponds to the predetermined tap sequence; and
a light indicator configured to emit light from the housing proximate the top surface of the housing, the light indicator being controlled to provide:
  at least in part in response to determining the first location by analyzing the audio signal, a first visual cue at the first zone at a first time, and at least in part in response to determining the second location by analyzing the audio signal, a second visual cue at the second zone at a second time subsequent to the first time.

2. The device of claim 1, wherein the predetermined tap sequence corresponds to a preset code that has been preset by the user, by another user, or by a manufacturer of the device.

3. The device of claim 1, further comprising a control module stored in the memory and executable by the one or more processors to perform one or more actions at least partly in response to the evaluating.

4. The device of claim 3, wherein the one or more actions include at least one of:
  increasing a volume at which the one or more speakers output the sound;
  decreasing the volume at which the one or more speakers output the sound;
  muting the one or more speakers;
  powering off the device;
  putting the device to sleep;
  confirming a transaction;
  authorizing a transaction; or
  adjusting at least one setting of the device.

5. The device of claim 1, wherein the pattern recognition module is further executable by the one or more processors to perform a spectral analysis on the audio signal to detect the series of taps.

6. A method comprising:
  under control of a computing device configured with executable instructions,
    outputting an audible prompt to enter a code via a series of taps on a surface of the computing device;
    illuminating a first visual designation on the surface of the computing device and a second visual designation on the surface of the computing device, the first visual designation identifying a first zone on the surface and the second visual designation identifying a second zone on the surface;
    generating an audio signal from sound captured from an environment by one or more microphones;
    identifying a first tap within the audio signal, the first tap corresponding to a first contact with the surface;
    based at least in part on characteristics of the audio signal:
      determining a first location of the first tap;
      determining that the first location corresponds to the first zone; and
      illuminating a first visual cue at the first zone;
    identifying a second tap within the audio signal, the second tap corresponding to a second contact with the surface subsequent to the first tap;
    based at least in part on characteristics of the audio signal:
      determining a second location of the second tap;
      determining that the second location corresponds to the second zone; and
      illuminating a second visual cue at the second zone subsequent to the first visual cue; and
    interpreting the first tap and the second tap correspond to the predetermined series.

7. The method as recited in claim 6, further comprising illuminating the first zone and the second zone on the surface of the computing device in an order in which the first and second taps are identified.

8. The method as recited in claim 6, wherein:
  the first location corresponds to a particular portion of the housing of the computing device; and
  the user input comprises a value associated with the particular portion of the housing.

9. The method as recited in claim 6, further comprising evaluating the user input; and
  performing one or more functions in response to the evaluating, the one or more functions being selected from a group of functions comprising operation-based functions, application-driven functions, communication-related functions, security-related functions, and entertainment functions.

10. The method as recited in claim 6, wherein the audible prompt prompts the user to enter a preset code, the method further comprising
  determining whether the user input corresponds to the preset code; and
  permitting a function to be performed if the user input corresponds to the preset code.

11. The method as recited in claim 6, further comprising at least one of:
  evaluating whether the user input corresponds to a preset code; or
  transmitting the user input to a remote system for evaluating whether the user input corresponds to the preset code.

12. A device comprising:
  one or more microphones configured to capture audio and generate an audio signal based on the captured audio;
  one or more speakers configured to output audio;
  one or more processors; and
  one or more computer-readable media having computer-executable instructions that, when executed by the one or more processors, cause the one or more processors to perform operations comprising:
    causing to be output, via the one or more speakers, an audible prompt to enter information via one or more contacts with a surface of the device;
    detecting a first tap within the audio signal, the first tap corresponding to a first contact with the device after the audible prompt;
    based on characteristics of the audio signal:
      determining a first location on the device associated with the first tap; and
      illuminating a first indicator zone on the device from among multiple indicator zones, the first indicator zone being proximate the first location;

interpreting the tap as a user input, a value of the user input based at least in part on the location; and upon receiving a second tap at a second location on the device, illuminating a second indicator zone from the multiple indicator zones, the second indicator zone being proximate the second location.

13. The device of claim 12, further comprising a light indicator comprising multiple zones and configured to emit light, the emitted light to illuminate one or more zones of the multiple zones at least partly in response to the user providing the tap.

14. The device of claim 13, wherein the tap is within one of the zones and the user input corresponds to an input value associated with the zone tapped.

15. The device of claim 13, wherein each of the one or more zones corresponds to an alpha-numerical value.

16. The device of claim 12, further comprising a haptic mechanism configured to output a touch-perceptive sensation at least partly in response to detecting the tap.

17. The device of claim 12, the operations further comprising performing one or more functions in response to identifying that the tap, the one or more functions selected from a group of functions comprising operation-based functions, application-driven functions, communication-related functions, security-related functions, and entertainment functions.

18. The device of claim 12, wherein the location is determined using at least one of:

passive acoustic location techniques;
beamforming techniques;
acoustic triangulation; or
time-of-arrival location techniques.

19. The device as recited in claim 1, wherein the pattern recognition module determines the location of each tap by analyzing the audio signal containing the tap to determine from various signal components provided by the one or more microphones, a direction from which the audio originated.

20. The device as recited in claim 1, wherein the light indicator comprises multiple light segments that are independently controllable to exhibit at least one of on/off illumination states, different colors, sequences, or visual effect.

21. The method as recited in claim 6, wherein the determining the location of the tap comprises analyzing the audio signal containing the tap to determine from various signal components provided by the one or more microphones, a direction from which the sound originated to identify a location associated the tap.

22. The method as recited in claim 6, wherein illuminating one or more zones comprises controlling individual light elements, of a light indicator with multiple light elements, to provide a different visible appearance of the individual light elements.

23. The method as recited in claim 6, wherein illuminating one or more zones comprises actively controlling individual light emitting diodes (LEDs), from among multiple LEDs mounted on the computing device, to exhibit at least one of different colors, sequences, or visual effect.

24. The device as recited in claim 12, wherein determining a location comprises, for each tap, analyzing the audio signal containing the tap to determine from various signal components provided by the one or more microphones, a direction from which the sound originated.

25. The device as recited in claim 1, wherein the light indicator is further configured to illuminate the first zone after receipt of the entirety of the series of taps and to cease illuminating the first zone prior to illuminating the second zone.

* * * * *